United States Patent [19]

Emmerich

[11] Patent Number: 5,392,218
[45] Date of Patent: Feb. 21, 1995

[54] ELECTRICALLY ISOLATED APPROACH TO SENSING DC VOLTAGES REFERENCED TO A FLOATING GROUND

[75] Inventor: Jeffery Emmerich, Rockford, Ill.

[73] Assignee: Sundstrand Corporation, Rockford, Ill.

[21] Appl. No.: 75,965

[22] Filed: Jun. 14, 1993

[51] Int. Cl.$^6$ .................. G01R 33/00; G01R 19/00; G01R 21/133
[52] U.S. Cl. .................. 364/483; 324/99 R; 324/99 D; 340/825.07
[58] Field of Search .............. 364/483, 550, 507; 340/825.07, 825.08; 324/99 D, 96, 118

[56] References Cited

U.S. PATENT DOCUMENTS

| | | | |
|---|---|---|---|
| 2,591,738 | 7/1949 | Spencer | 324/102 |
| 3,430,125 | 2/1969 | Povenmire et al. | 324/118 |
| 3,714,540 | 1/1973 | Galloway | 324/118 |
| 4,041,470 | 8/1977 | Slane et al. | 364/424.04 |
| 4,896,277 | 1/1990 | Vercellotti et al. | 340/825.07 |
| 5,153,510 | 10/1992 | Kominsky | 364/483 |
| 5,170,115 | 12/1992 | Kashiwabara et al. | 364/483 |
| 5,272,476 | 12/1993 | McArthur | 340/825.07 |

Primary Examiner—Thomas G. Black
Assistant Examiner—Tyrone V. Walker
Attorney, Agent, or Firm—Jeffery J. Makeever

[57] ABSTRACT

An analog isolation barrier data acquisition system comprises a plurality of satellite sampling modules which are referenced to remote grounds for sensing direct current (dc) voltages which are referenced to these remote grounds. The satellite sampling modules are capable of monitoring several signals which are referenced to its local ground system, and are comprised of three functional blocks: a signal selection block which allows proper selection of the dc voltage signal to be monitored; a modulation block which modulates the selected dc voltage signal to produce a modulated waveform; and a barrier coupling block which transfers waveform information contained in the modulated waveform from the local floating ground reference system to an analog ground reference system. A central control module, coupled to each of the satellite sampling modules and referenced to the analog ground system, is comprised of three functional blocks: a waveform generation block which generates a basis waveform for use by the modulation blocks; a circuit block which demodulates the modulated waveform information produced by the modulation block of each satellite sampling module; and a master control block for generating control logic signals which are based on information received from the basis waveform generation block.

5 Claims, 7 Drawing Sheets

ELECTRICALLY ISOLATED APPROACH TO SENSING DC VOLTAGES REFERENCED TO A FLOATING GROUND

FIELD OF THE INVENTION

The instant invention relates generally to data acquisition systems, and more particularly to a multichannel data acquisition system capable of sampling slow moving, positive and negative analog inputs with respect to multiple remote ground references.

BACKGROUND ART

The ever-increasing electro-magnetic susceptibility and lightning requirements in the aircraft industry are forcing controls designers toward more robust solutions to deal with these higher threat levels. These threats include immersion in radio frequency fields with levels as high as 200 volts per meter (V/M) and lightning strike voltages as high as 600 volts (V). One explanation for the increased threat level requirements is that the effectiveness of the shielding of the internal wiring, provided by the skin of the aircraft, has been reduced as more and more of the aircraft's structure is constructed of composite materials. Regardless of the rationale for, or the necessity of these increased requirements, it is becoming obvious that many of the prior art defenses are no longer design options.

Instead of absorbing the energy coupled or injected onto the controller's interconnecting wiring (as is done in the prior art with the use of tranzorbs or metal oxide varistors), it is becoming necessary to present a high impedance to the outside world which is capable of withstanding potentials in the hundreds of volts with respect to the airframe. In many applications such as power driver circuitry, this becomes a problem since the output impedance is purposely kept as low as possible in order to minimize power losses. One method known in the art which may be employed to accomplish both of these goals is to "float" the output driver and its source from the airframe and the chassis of the controller. In this way the impedance of the drive current path may be kept low, and the impedance between the output lines (both drive and return lines) and the structure, to which the threat is referenced, may be kept very high. Isolating the output grounds in this way also acts as a barrier to coupling of the radio frequency noise threats onto the sensitive internal, possibly microprocessor driven, control circuitry, or the radiating of the high frequency noise generated by the digital circuitry out of the controller via the output wiring.

Along with these advantages come a number of design challenges, not the least of which is providing the microprocessor a means to access and measure various system and driver related signals that are referenced to a ground which is isolated from the processing system reference. These signals fall into primarily three categories:

1) Discrete signals such as switch inputs which are easily accommodated through the use of opto-couplers;
2) Alternating current (ac) signals which, in aircraft power generation systems, are primarily 115 volts, 400 hertz, three phase signals which are easily measured by the use of small signal transformers; and
3) Direct current (dc) analog signals.

It is this third category of dc, or slow moving analog (essentially direct current (dc)) signals which presents the most difficulty. The task is to design a multichannel data acquisition system capable of sampling slow moving, positive and negative analog inputs with respect to multiple remote ground references and to store these values in a format accessible to the internal microprocessor-driven control circuitry. The sample may be stored digitally or as an analog value to be read via an analog-to-digital converter. In either case, the remote ground sampling system must be autonomous of the microprocessor system, requiting no synchronization and must allow microprocessor access to the stored values at any instant in time. That is to say, operation of the sampling system, or analog isolation barrier as it will be called hereafter, should be transparent to the microprocessor system. Further, due to the limited amount of available printed wiring board real estate and the ever-increasing economic pressures, the design solution should be of small size and low cost. It is clear that such circuitry could find uses in fields other than aerospace control units, perhaps in medical probes which might demand isolation between equipment and patient or in high voltage power supply applications where a signal to be measured may be referenced to a point several hundred volts above the local ground.

The instant invention is directed to overcoming one or more of the above problems while meeting all of the design requirements.

SUMMARY OF THE INVENTION

It is the principle objective of the instant invention to provide a new and improved data acquisition system, and more specifically, a data acquisition system which provides an analog isolation barrier capable of sensing various slow moving analog (essentially dc) signals which are referenced to remote or "floating" grounds. These floating grounds may be separated from the local measurement ground by several hundred volts.

In an exemplary embodiment of the instant invention, an analog isolation barrier data acquisition system comprises a plurality of satellite sampling modules which are referenced to the floating grounds for sensing direct current (dc) voltages which are referenced to these floating grounds. These satellite sampling modules are capable of monitoring several signals which are referenced to its local ground system, and are comprised of three functional blocks. Firstly, a signal selection block is provided to allow proper selection of the dc voltage signal to be monitored. Secondly, a block is provided within each satellite sampling module which modulates the selected dc voltage signal to produce a modulated waveform. Lastly, each satellite sampling module contains a barrier coupling block which transfers waveform information contained in the modulated waveform produced by the modulation block from the local floating ground reference system to an analog ground reference system.

Further, a central control module is coupled to each of the satellite sampling modules. This central control module, which is referenced to the analog ground system, is comprised of three functional blocks. Firstly, a block is provided which generates a basis waveform for use by the modulation blocks of each of the satellite sampling modules as a carrier waveform. The basis waveform generating block uses control signal inputs and outputs to receive and transmit control and waveform status information throughout the barrier isolation system. Secondly, a circuit block which is electrically connected to the barrier coupling block of each satellite sampling module is provided which demodulates the modulated waveform information produced by the modulation block of each satellite sampling module. Thirdly, a master control block is provided for generating control logic signals which are referenced to a digital ground system. These control logic signals are used by the satellite sampling modules and by the demodulation block for controlling proper selection and demodulation of the dc voltage signal to be monitored. These control logic signals are based on information received from the basis waveform generation block.

Other objectives and advantages will become apparent from the following specification taken in conjunction with the accompanying drawings.

BRIEF DESCRIPTION OF THE DRAWINGS

Reference is now made to the Description of the Preferred Embodiments, taken in conjunction with the accompanying illustrations, in which.

DESCRIPTION OF THE PREFERRED EMBODIMENTS

Throughout the following description, the generic term "block" will be utilized as a convenient way of referring to the circuit elements and associated wiring and control logic which perform the functions described.

Figure 1:
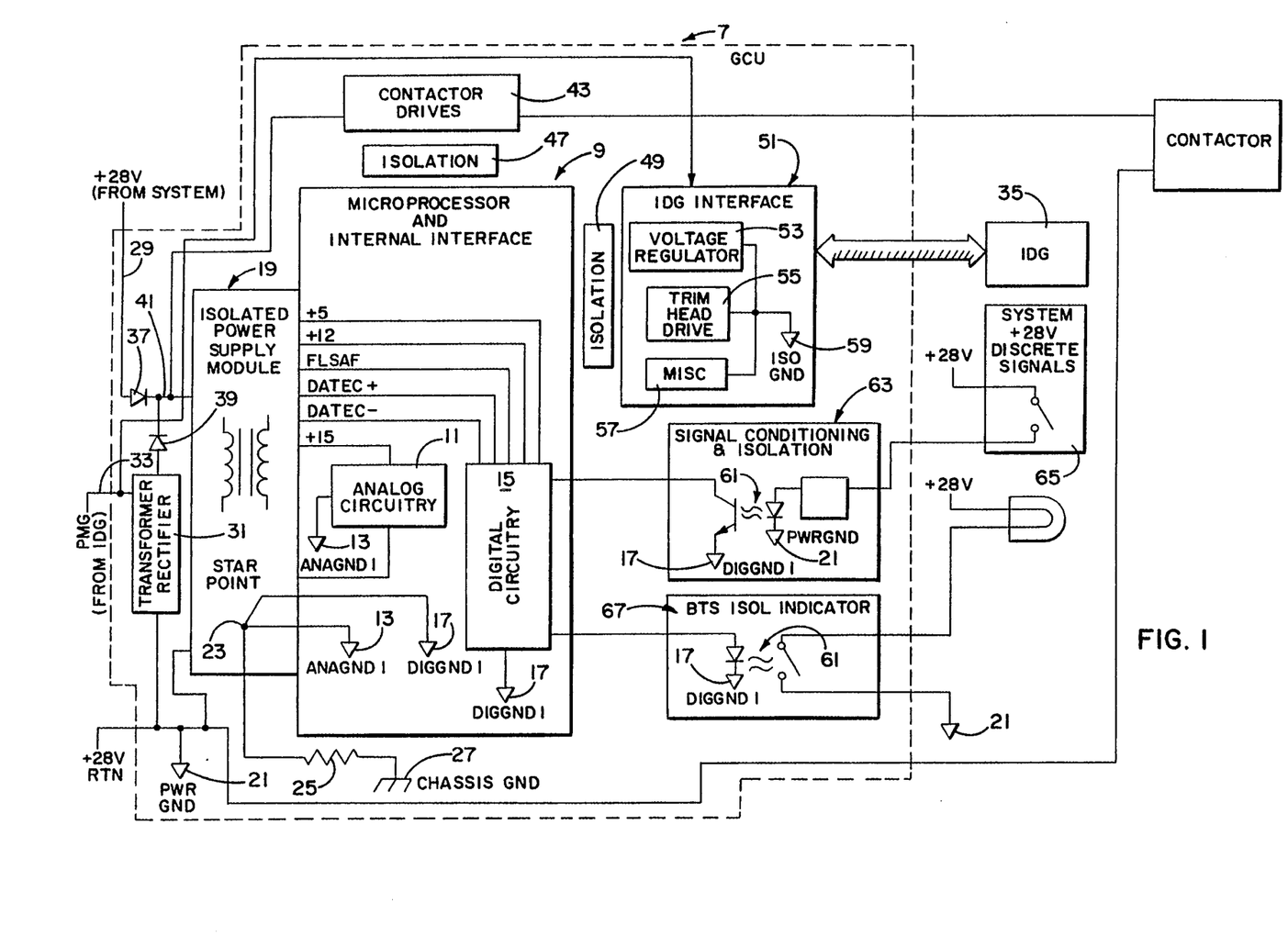
FIG. 1 is a block diagram representation of a typical grounding scheme for a microprocessor based generator control unit used in aircraft electrical power generating systems.

FIG. 1 of the drawings depicts the general controller grounding scheme for use by a Generator Control Unit (GCU) 7 of an aircraft electrical power generating system (EPGS). Within this unit, the microprocessor and internal interface block 9 is comprised of analog circuitry 11 referenced to an analog ground system 13, and digital circuitry 15 referenced to a digital ground system 17. The microprocessor and internal interface block 9 is powered by the isolated power supply module 19 which is referenced to the power ground 21 system. The isolated power supply module 19 also contains the location where the analog ground 13 and the digital ground 17 are connected together, hereinafter the "star point" 23 and which, through a high impedance resistor 25, are connected to the chassis ground 27 of the control unit. The isolated power supply module 19 receives its power from two sources: directly from the aircraft 28 Vdc system 29; and from the rectified permanent magnet generator (PMG) input 33, through the engine mounted integrated drive generator (IDG) 35 28 Vdc output of transformer rectifier 31. These two sources are ORed together through diodes 37, 39 to produce a single power feed 41 to power the isolated power supply module 19, as well as the contactor drives 43 which open and close the aircraft contactors 45 which are referenced to power ground 21. A first isolation barrier 47 exists between the contactor drives 43 and the microprocessor and internal interface block 9. A second isolation barrier 49 exists between the IDG interface block 51 and the microprocessor and internal interface 9. The microprocessor and internal interface 9 has internal functional blocks which include the voltage regulator 53, the trim head driver 55, and other miscellaneous functions 57 all referenced to an isolated ground 59. Optical isolation 61 is used to isolate the microprocessor and internal interface 9 both from the signal conditioning and isolation block 63, which block 63 monitors the system 28 Vdc discrete signals 65 referenced to power ground 21, and from the BTS ISOL indicator 67 which is also referenced to power ground 21.

Of particular interest is the separation of the star point grounds 23 (i.e. analog 13 and digital 17 grounds) from the power 21 and isolated 59 grounds. Power ground 21 is essentially the battery power return and does have certain controller monitors referenced to it. Ultimately this ground 21 is tied to the airframe somewhere in the aircraft wiring but is not necessarily at the same potential as the local controller chassis ground 27. Furthermore, in order to maintain the isolation provided by the isolated power supply module 19, as implemented as a DC-DC switching converter, the star point 23 is intentionally not tied to power ground 21.

The majority of the circuitry on the integrated drive generator (IDG) interface block 51 is referenced to isolated ground 59. Unlike power ground 21, isolated ground 59 is floating (i.e. not tied to any part of the aircraft structure or referenced to any other potential). The majority of the remotely grounded signals which must be monitored by the microprocessor are referenced to this ground 59.

Figure 2:
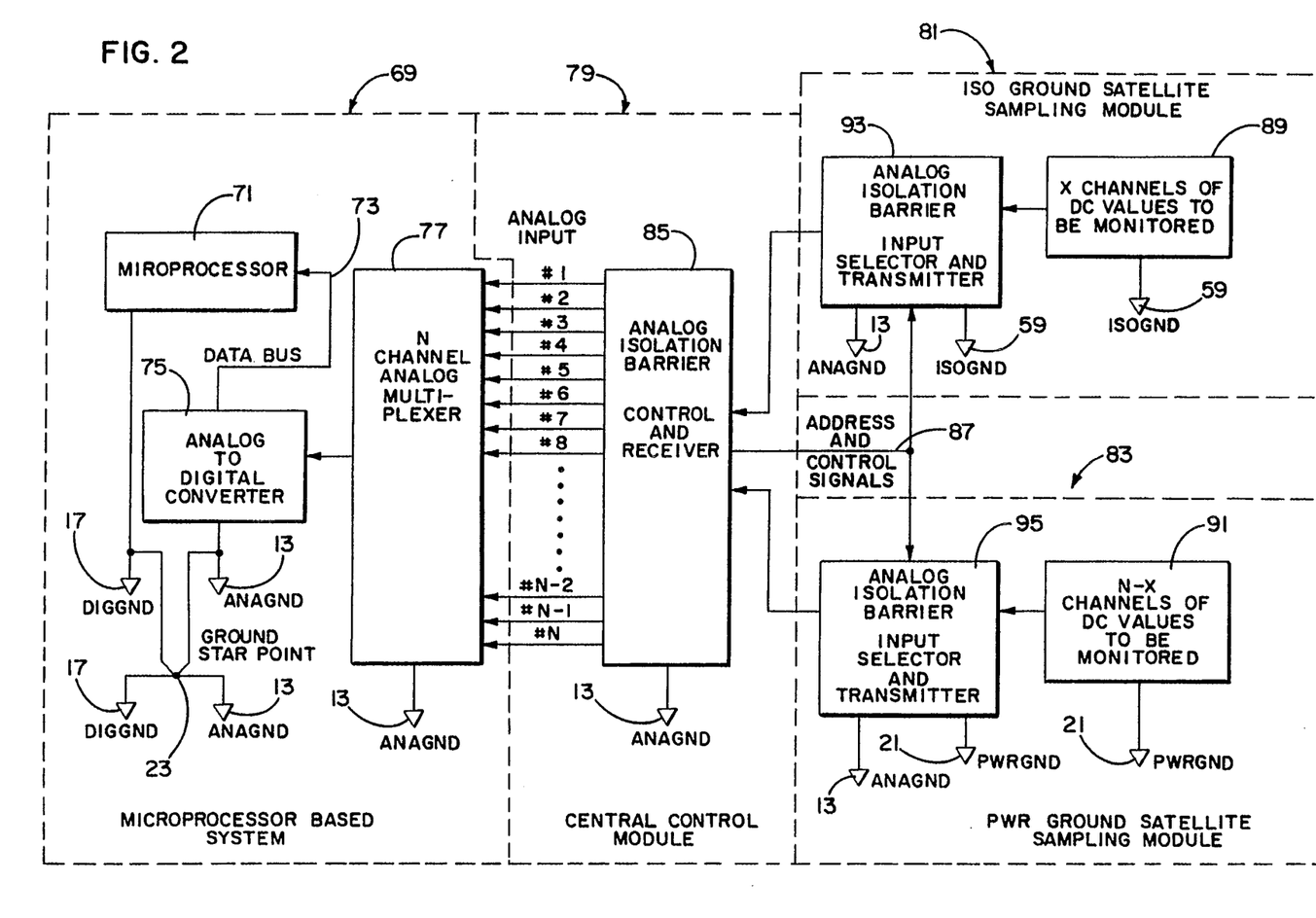
FIG. 2 is a block diagram representation of the analog isolation barrier data acquisition system of the instant invention as interfaced to a microprocessor based system.

Due to the number of signals "n" which must be monitored and the fact that these signals are distributed amongst two remote grounds 21, 59, it is desirable to adopt an analog isolation barrier scheme as shown in FIG. 2. In this figure the microprocessor based system 69 to which the isolation barrier scheme will interface is depicted as a simplified block diagram having a microprocessor 71, referenced to digital ground 17, and is further connected by data bus 73 to an analog to digital converter 75 referenced to analog ground 13. The output of a "n" channel analog multiplexer 77 is coupled to the input of the analog to digital converter 75, and is also referenced to analog ground 13. The isolation barrier scheme of the instant invention is shown as comprising three sections: a central control module 79, a isolated ground satellite sampling module 81, and a power ground satellite sampling module 83. The central control module 79 is comprised of the analog isolation barrier control and receiver block 85 which transmits address and control signals 87 to and receives information from the satellite sampling sections 81, 83. The analog isolation barrier control and receiver block 85 then outputs that information to the "n" channel analog multiplexer 77 of the microprocessor based system 69.

The satellite sampling sections 81, 83 are each comprised of two blocks: a monitoring block 89, 91 respectively which monitors the "n" signals, and the analog isolation barrier input selector and transmitter block 93, 95 respectively which receives the address and control signals 87 from the analog isolation barrier control and receiver block 85.

The processor system 69 to which the analog barrier must interface already uses an analog to digital converter 75 to measure various internal signals as well as the peak values of many 400 Hz waveforms which have been isolated through the use of signal transformers as discussed earlier. These signals are individually routed to the central A/D converter 75 through analog multiplexers addressed by the microprocessor 71. This approach is maintained in the microprocessor's access of the barrier sampled inputs. As discussed above, the barrier consists of one central control module 79 which is referenced to analog ground 13 and two satellite sampling sections 81, 83, one referenced to isolated ground 59 and one to power ground 21. The central control module 79 selects which satellite sampling module 81, 83 from which an input is to be sampled and transmits the address of the selected input. Similarly to a commercially available isolation amplifier, the input signal is first modulated, coupled across a barrier, and demodulated at the output. The barrier design detailed herein also uses a modulation-demodulation approach, but one conceived by me, rather than a traditional method (such as AM or FM). In addition to the addressing and selection tasks described earlier, the central control section also:

1) Generates the ac carrier waveform necessary in the modulation approach (hereinafter referred to as the basis waveform);
2) Receives and demodulates the information transmitted by the selected satellite sampling module 81, 83; and
3) Stores the analog information in an orderly fashion so that the microprocessor 71 may retrieve it.

The role of the satellite sampling module 81, 83 is to access the analog channel requested by the central control module 79 and transmit the modulated value of that input. The cost and part count of the satellite sections 81, 83 is kept low so as to minimize the expense incurred as the barrier is expanded to sample from several remote grounds.

As mentioned earlier, the barrier operates independently, requiring no software input for either control or data access. All of the sampled values are continuously available for the microprocessor 71 to read at its leisure. All "n" channels of analog data are updated once every 20 mS in the exemplary embodiment of the instant invention. The barrier circuitry of the monitoring blocks 89, 91 is capable of reading a signal within the range of −9 to +9.75 volts referenced to isolated ground 59 and 0 to +9.75 volts referenced to power ground 21, to within ±3% of full scale over the temperature range of −40 to +75 degrees Celsius and operates to within ±6% over the full military temperature range of −55 to +125 degrees Celsius. The barrier is designed to operate with potentials as high as 600 V separating analog ground 13 and the remote grounds 21, 59. To allow for flexibility, the barrier is configurable such that the number of signals "n" which will be sampled from each ground 21, 59 may be changed without cutting circuit traces, adding components or installing jumpers (via a programmable logic change for instance).

Figure 3:
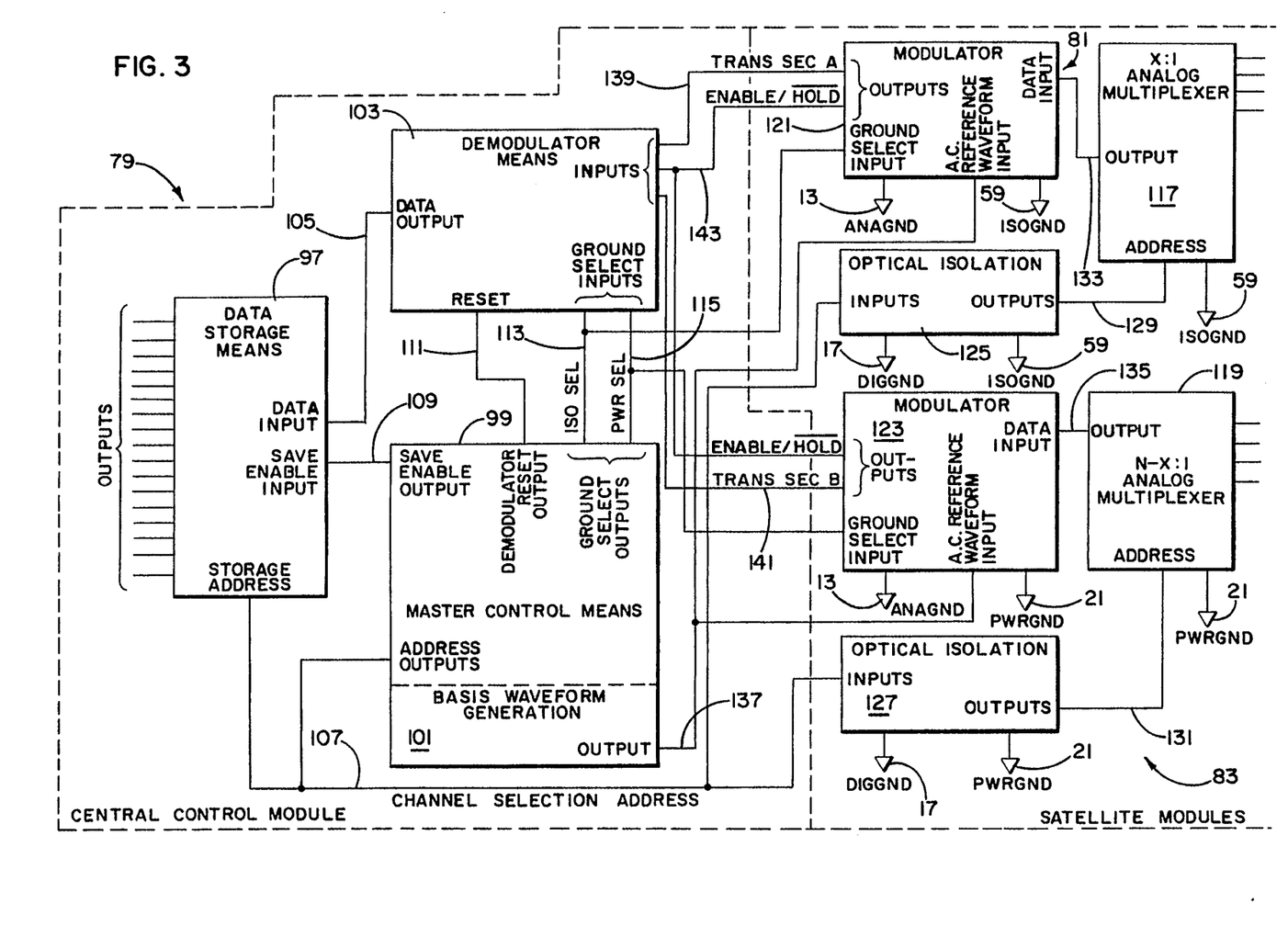
FIG. 3 is a detailed block diagram of the analog isolation barrier data acquisition system topography of the instant invention.

A detailed block diagram of the barrier design is shown in FIG. 3. The central control module 79 is comprised of four major blocks:

1) Data storage means 97;
2) Master control means 99 for generating control logic signals 107 referenced to a digital ground 17 reference system;
3) Means 101 for generating a basis waveform; and
4) Means 103 for demodulating the waveform information from the satellite sampling modules 81, 83.

The demodulator means 103 output signal is transmitted via the data line 105 to the data storage means 97, and is stored when both a binary address is transmitted via the channel selection address line 107 and the save enable line 109 is set high by the master control means 99. The master control means 99 also communicates with the data sample demodulator means 103 via the reset line 111 and the two ground select lines (ISO select 113 and PWR select 115) which are also transmitted to the satellite sections 81, 83.

The satellite sections 81, 83 are each comprised of three major blocks:

1) Means for selecting a dc voltage signal to be monitored, as illustrated by the analog multiplexer 117, 119;
2) Means for modulating the selected dc voltage signal, and barter coupling means for transferring waveform information produced by the modulating means from a floating ground reference system 21, 59 to an analog ground reference system 13, as illustrated by modulator 121, 123;
3) Means for isolating the control logic signals 107 produced by the master control means 99 referenced to digital ground 17 from the satellite sampling modules 81, 83 referenced to floating ground reference systems 21, 59, as illustrated by optical isolation 125, 127.

The signal to be monitored is selected by the analog multiplexer 117, 119 when a binary address is transmitted to the optical isolation block 125, 127 by the master control means 99 via the channel selection address line 107. The optical isolation block 125, 127 transforms the address data from a digital ground 17 system to an isolated ground 59 or a PWR ground 21 system on address line 129, 131 for use by the analog multiplexer 117, 119. Once the remotely referenced signal has been selected, the signal information is transmitted via data line 133, 135 to the modulator 121, 123. The modulator 121, 123 selected by the master control means 99 via the ground select line 113, 115 uses the basis waveform on line 137 to generate the transec 139, 141 and the enable/hold* 143 (hereinafter an asterisk will denote the low assertion of a signal) output signals transmitted to the demodulator means 103 of the central control module 79.

The analog multiplexer 117, 119 accepts the binary address via line 107 from the master control means 99, optically isolates it via optical isolation block 125, 127 to produce an address on line 129, 131 referenced to the remote ground 59, 21 and supplies the selected channel input via line 133, 135 to the modulator 121, 123. The modulator 121, 123 uses this input in conjunction with the basis waveform transmitted via line 137 to produce the enable/hold* 143 and transec 139, 141 outputs (referenced to analog ground 13). These two signals carry the information necessary for the demodulator means 103 in the central control module 79 to reconstruct the voltage sampled by the remotely grounded satellite sampling module 81, 83, with respect to analog ground 13.

The master control means 99 generates the ground select lines 113, 115 which are used to select the desired transec 139, 141 and enable 143 modulator outputs. When an individual satellite sampling module 81, 83 is not selected, its enable/hold* 143 output is tristated. In this way, the "n" input channels may be distributed among the remote grounds 59, 21 in any fashion and the master control means 99 simply keeps track of which ground each data channel is referenced.

Figure 7:
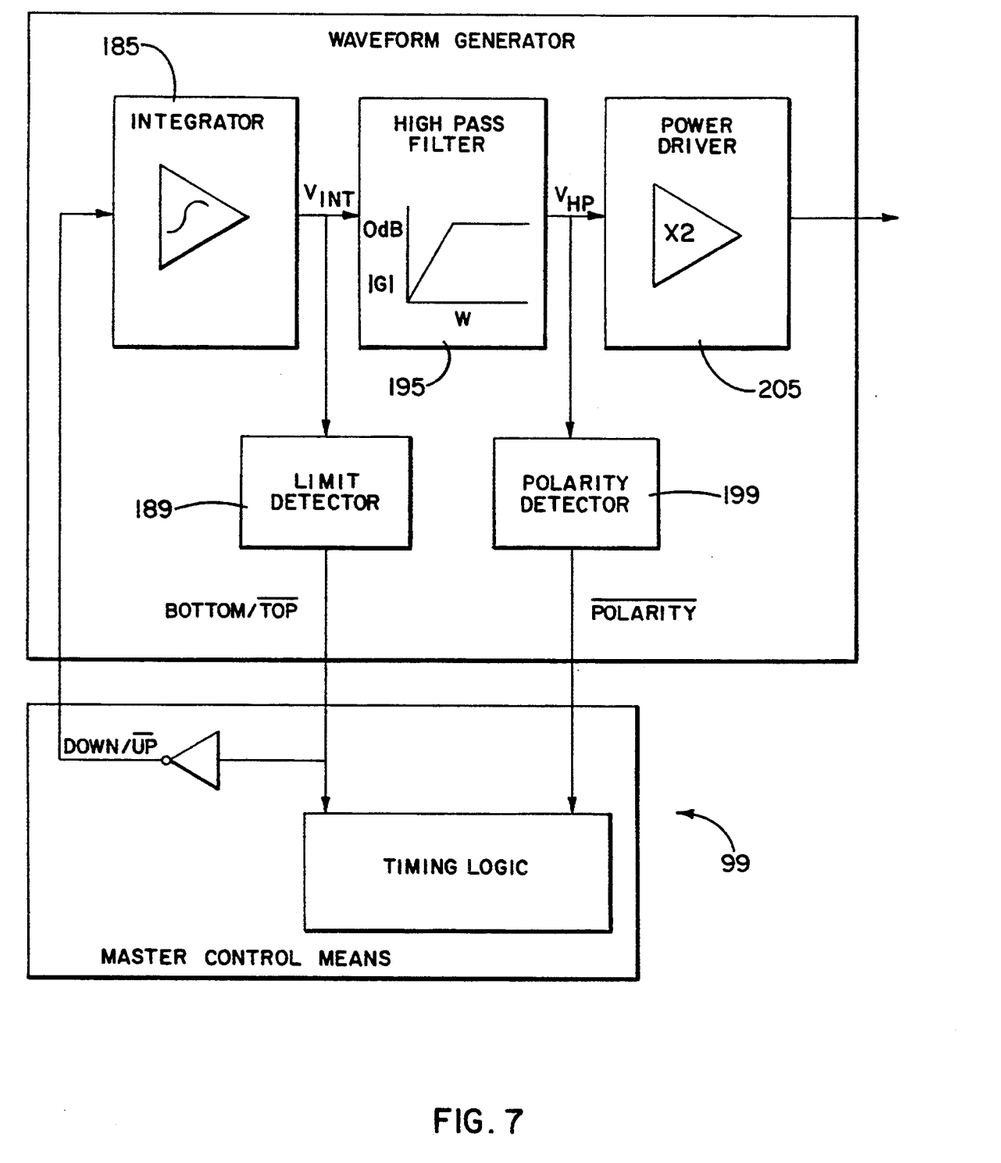
FIG. 7 is a block diagram of the basis waveform generator and the relevant interaction with the master control logic block of the instant invention.
Figure 8:
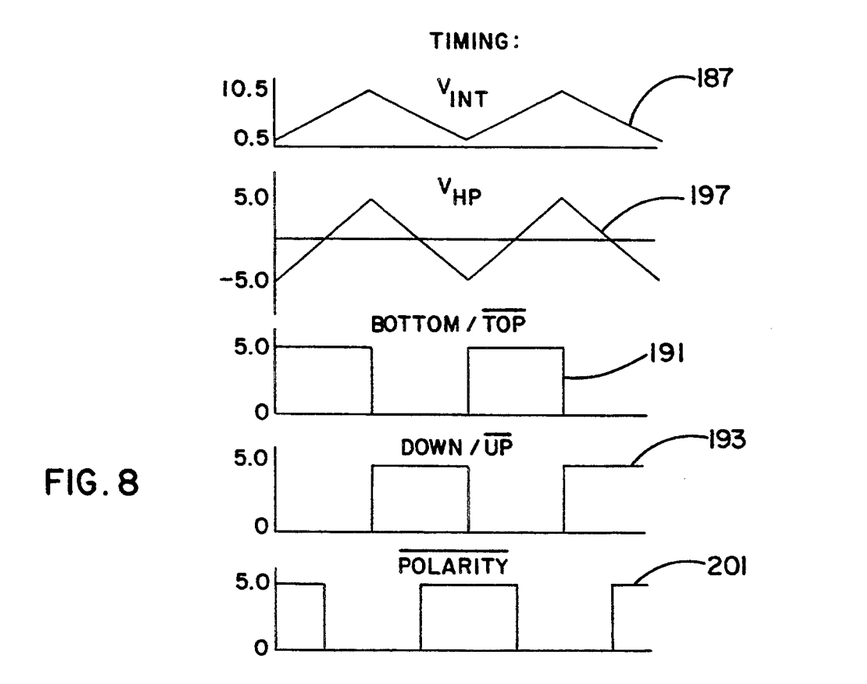
FIG. 8 is a waveform timing diagram illustrating the basis waveform generation and relevant interaction with the master control logic block of the instant invention.

At the heart of this isolation scheme is the master control means 99 and the basis waveform generation means 101. The master control means 99 is so intimately involved in the production and monitoring of the basis waveform 145 (see FIG. 4) that a dotted line is shown between the two functions. The basis waveform generation means, as illustrated in FIG. 7, comprises five blocks:

1) integrator means 185 for generating an output waveform $V_{INT}$ 187 (waveforms illustrated in FIG. 8) which ramps upwards at a rate of +X volts/sec or downwards at a rate of −X volts/sec. The integrator means 185 has a first control signal input;

2) limit detection means 189 for producing a first control signal and its inverse 191 based on the magnitude of the output waveform 187 from the integrator means 185. This first control signal 191 is transmitted from the limit detection means 189 to the master control means 99 for use therein, and the inverse 193 of the first control signal 191 is transmitted from the control logic means 99 to the first control signal input of the integrator means 185 for use in controlling the direction of output waveform ramping;

3) high pass filter means 195 electrically connected to the output of the integrator means 185 for removing any dc content contained in the output waveform 187. This high pass filter means 195 produces a symmetrical output waveform $V_{HP}$ 197 about the zero volt axis;

4) polarity detection means 199, monitoring the symmetrical output waveform 197 from the high pass filter means 195, for generating a polarity control signal 201 for use by the master control means 99. This polarity control signal 201 transitions upon a change of polarity of the symmetrical output waveform 197; and 5) power drive means 203 coupled to the high pass filter means 195 for amplifying the symmetrical output waveform 197 to a suitable level for use by the modulation means 121 (FIG. 3) of the satellite sampling modules 81, 83 (FIG. 3).

Figure 4:
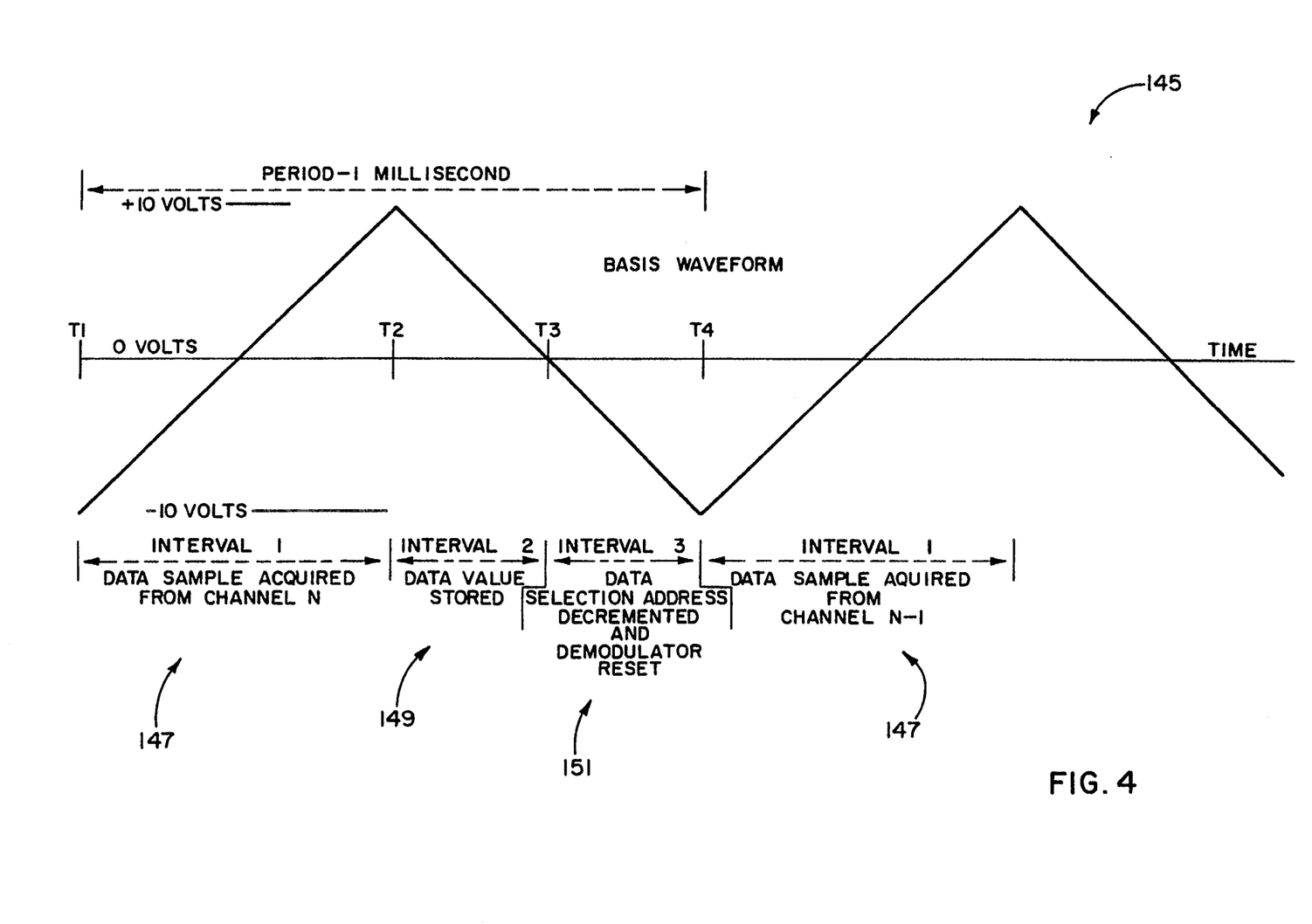
FIG. 4 is a data acquisition cycle timing diagram of the instant invention.

As shown in FIG. 4, the basis waveform 145 is an AC signal which is used in the modulation/demodulation process and also serves as a timing signal for the entire data acquisition process. FIG. 4 shows the stages in the data acquisition cycle which are synchronized to the basis waveform 145. A triangle wave was selected as the basis waveform 145 due to the ease in which it is generated, and the constant dV/dt which will be seen to be helpful later. The acquisition cycle is divided into three time intervals: T1 to T2 147, T2 to T3 149, and T3 to T4 151. During the first interval from T1 to T2 147 the basis waveform 145 scans the input range from −10 V to +10 V. During this time the value of the input to be sampled is acquired by a method which will be described below.

In the second interval, from T2 to T3 149, the sampled value is stored in the appropriate sample and hold element of the data storage means 97 (FIG. 3) for the microprocessor 71 (FIG. 2) to access at its leisure. During the final interval, from T3 to T4 151, the channel selection address 107 is decremented and the demodulator means 103 (FIG. 3) is reset 111 in preparation for the next acquisition cycle.

Throughout this entire cycle, it is the job of the master control means 99 (FIG. 3) to monitor the progress of the basis waveform 145 and to provide the control signals necessary for the storage of data 109, resetting of the demodulator 111, and selection of the input address 107 (see FIG. 3 for signal references) at the desired moments in time.

Figure 5:
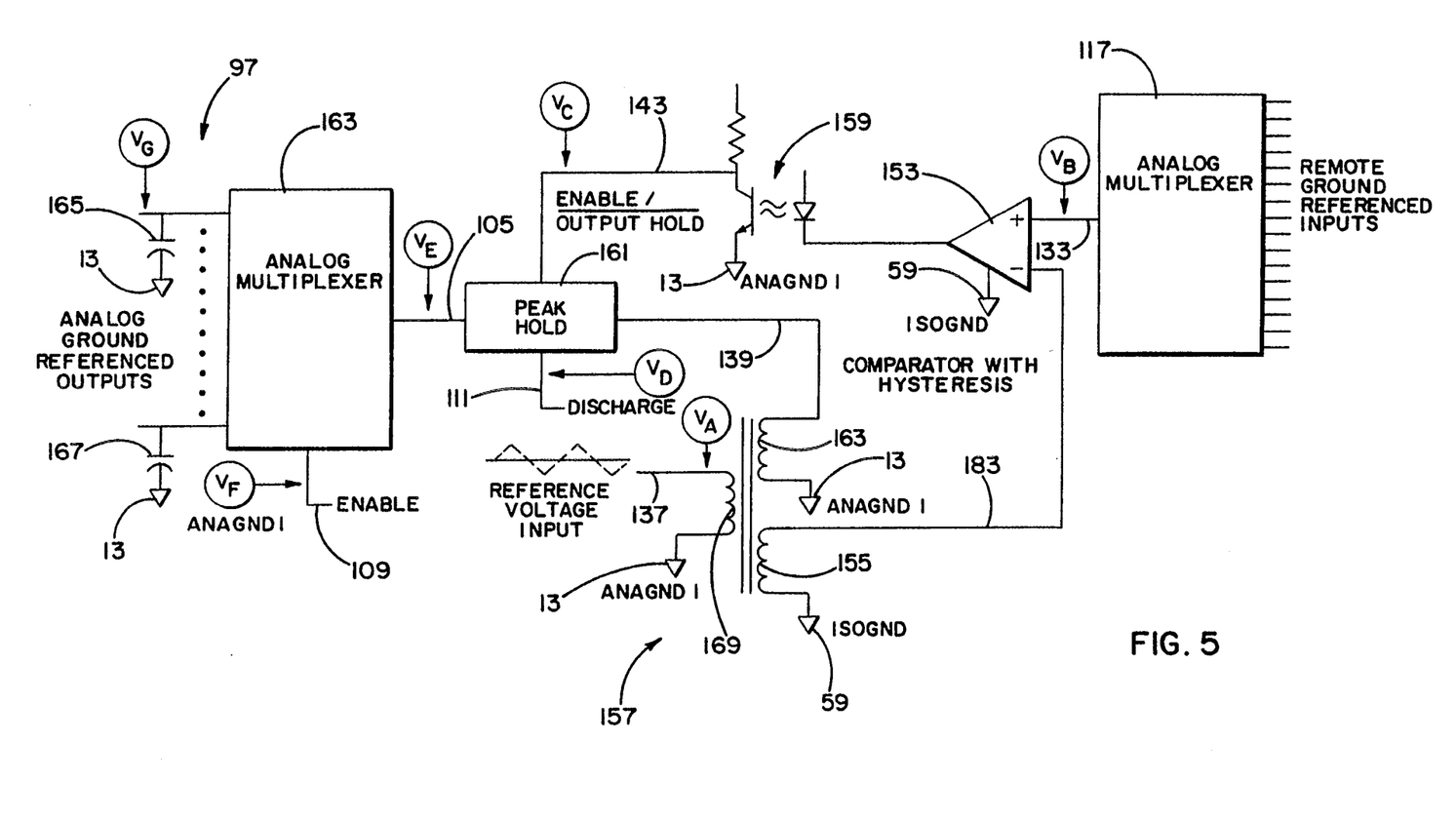
FIG. 5 is a simplified block diagram of the analog isolation barrier data acquisition system modulation scheme of the instant invention.

The modulation-demodulation approach of the instant invention introduced above may now be explained with reference to FIG. 5 and FIG. 6. This electrically isolated method of sensing dc voltage signals referenced to floating grounds 59 comprises the steps of:

a) generating a basis waveform 145 referenced to an analog ground reference system 13;

b) transforming this basis waveform 145 from the analog ground reference system 13 to the floating ground reference system 59 which produces a transformed basis waveform of like magnitude on line 183;

c) comparing the magnitude of the transformed basis waveform on line 183 to that of the selected dc voltage signal on line 133;

c) generating an output hold control signal 175 when the magnitude of the transformed basis waveform on line 183 and the magnitude of the selected dc signal on line 133 are approximately equal;

d) holding, via peak hold circuit 161, the peak value of the magnitude of the basis waveform 145 referenced to an analog ground reference system 13 when the output hold control signal 175 is generated;

e) storing the peak value of the magnitude of the basis waveform;

f) resetting the peak hold circuit 161.

A means for transforming the basis waveform from an analog ground 13 reference system to a floating ground 59 reference system is provided which produces a first transformed basis waveform on line 183 of like magnitude, and a second transformed basis waveform of like magnitude on line 139 referenced to analog ground 13, such as is illustrated by the three winding isolation transformer 157 with a turns ratio of 1:1:1. The analog multiplexer 117 of the ISO ground satellite sampling module 81 is coupled to means for comparing the magnitude of the first transformed basis waveform to that of the selected dc voltage signal, such as illustrated by a comparator with hysteresis 153, via line 133. The inverting terminal of the comparator 153 is connected by line 183 to a secondary 155 of the three winding isolation transformer 157. Both the comparator 153 and the secondary 155 are referenced to isolated ground 59. The comparator 153 generates an output hold control signal and, through barrier coupling means such as an optical isolator 159, generates the enable/hold* signal 143. The enable/hold* signal 143 is communicated to a first control input of a peak hold circuit 161 whose analog signal input is driven from the other secondary 163 of the isolation transformer 157 via the transec line 139. The demodulated signal output of the peak hold circuit 161 is transmitted to an analog multiplexer 163 which, in conjunction with capacitors 165, 167 and enable line 109, forms the data storage means 97 of the instant invention. The primary winding 169 of the isolation transformer 157 is connected to the basis waveform generation means 101 (FIG. 3) via line 137 and referenced to analog ground 13, as is the secondary winding 163 which connects to the peak hold circuit 161.

Figure 6:
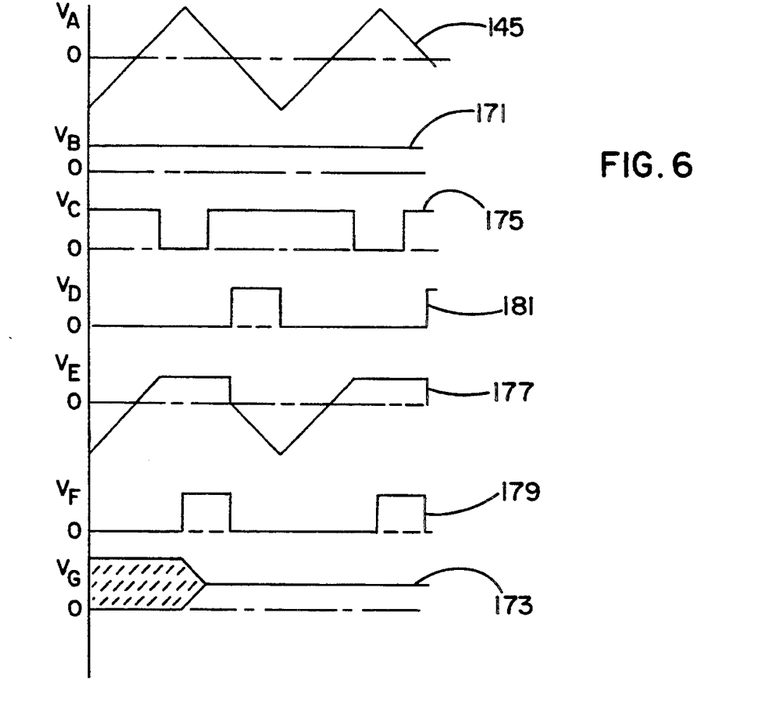
FIG. 6 is a waveform timing diagram illustrating the modulating scheme of the instant invention.

At the start of a typical data acquisition cycle, the input voltage to be measured has already been selected by the master control means 99 via the channel selection address 107 as shown in FIG. 3 and appears as VB 171 of FIG. 6 at the noninverting terminal of the comparator 153 referenced to the remote ground 59. It is desired to recreate this voltage across the sample and hold output capacitor 165 as VG 173 with respect to analog ground 13. In order to see how this occurs, first assume the basis waveform 145 (VA) is applied to the primary winding 169 of an isolation signal transformer 157. The transformer 157 used has two secondaries 155, 163, each with a 1:1 primary to secondary turns ratio. An important transformer specification is that the secondaries be closely matched to each other. A key feature of this design is that it is somewhat self-correcting for any imperfections which may occur in the generation and transmission of the basis waveform 145. As long as the transformer secondaries 155, 163 are closely matched, changes in the basis waveform 145 (including amplitude, frequency, slope, or waveform distortion such as a concave or convex slope) or transformer imperfections (nonideal input to output voltage ratios or basis waveform distortion) will have no effect on the accuracy of the barrier. The reason for this will be apparent shortly.

One of the secondaries 163 is referenced back to analog ground 13 and serves as the input to a modified peak hold circuit 161. While the enable/hold* input 143 is high, the circuit behaves as any peak hold, capturing and retaining the peak value of its input over time. When the enable/hold* line 143 drops low, the present output value is frozen and no additional peaks will be captured until the enable/hold* line 143 returns high.

The other transformer secondary 155 is input to the comparator's 153 inverting terminal. Instead of the conventional approach of supplying the comparator with a fixed reference to compare to a moving input signal, the input signal is a DC value (at least with respect to the 1 mS cycle time) and the reference is scanned from the lowest possible input voltage to the highest. This takes place during the first half cycle of the basis waveform 145, from T1 to T2 147 as shown on FIG. 4. When the secondary voltage equals the selected input voltage, VB 171, the comparator output drops low, turning on the opto-coupler's 159 LED and driving the enable/hold* line 143 low. The importance of the matched transformer secondaries 163, 155 can now be seen. Prior to time T1 of FIG. 4, the peak hold circuit 161 had been reset to a value of −10 volts via the reset signal at the second control input to the peak hold circuit 161 on reset line 111 (by the master control means 99 as described earlier and shown in FIG. 3). While the remote ground referenced secondary's 155 voltage is scanning past the input signal, the peak hold circuit 161 is following the monotonically increasing voltage from the other secondary 163. As long as the secondaries 163, 155 are matched, the voltage appearing at the comparator's 153 inverting input (with respect to the remote ground 59) will be precisely the same voltage applied to the peak hold circuit's 161 input (with respect to analog ground 13). Therefore, when the comparator 153 switches and VC 175 goes low, the output of the peak hold circuit 161, VE 177, will be equal to VB 171 except referenced to analog ground 13 (as shown in the trace of VE 177).

The master control means 99 of FIG. 3 now takes over. At time T2 the sample and hold enable voltage, VF 179, is driven high, and VG 173 is set to VE 177. The master control means 99 continues to monitor the basis waveform 145 and at time T3 does three things:

1) VF 179 is returned low to save the new value;
2) The peak hold circuit 161 is reset by activating the reset input signal 111 as seen by trace VD 181. In this mode the internal peak hold capacitor voltage simply follows the input (as seen in the trace of VE 177). Since the basis waveform 145 is ramping down toward −10 V, this will reset the peak hold circuit 161 to exactly the right level in preparation for the next acquisition cycle; and
3) The address selection counter within the master control means (not shown) is decremented in order to access the next input to be sampled and select the next storage location.

At time T4, the selection address has settled, VB 171 is equal to the next input value and VE 177 is at −10 V. The master control means 99 (see FIG. 3) turns off the reset signal 111 and another acquisition cycle commences. This process continues indefinitely every 1 mS (the period of the basis waveform 145) such that each of the stored values will be updated every "n" mS.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An analog isolation barrier data acquisition system, comprising:

a plurality of satellite sampling modules each exclusively referenced to one of a plurality of floating grounds for sensing direct current (dc) voltages which are referenced to floating grounds, said satellite sampling modules comprising:

(a) means for selecting a dc voltage signal to be monitored;

(b) means electrically connected to said dc voltage signal selection means for modulating the selected dc voltage signal to produce a modulated waveform; and (c) barrier coupling means for transferring waveform information contained in said modulated waveform produced by said modulation means from a floating ground reference system to an analog ground reference system; and a central control module coupled to said satellite sampling modules and referenced to an analog ground system comprising:

(a) means for generating a basis waveform for use by said modulation means of said satellite sampling modules as a carrier waveform, said basis waveform generating means having control signal inputs and outputs to receive and transmit control and waveform status information;

(b) means electrically connected to said barrier coupling means for demodulating said modulated waveform information produced by said modulation means of said satellite sampling modules; and (c) master control means for generating control logic signals referenced to a digital ground for use by said satellite sampling modules and by said demodulation means for controlling proper selection and demodulation of the dc voltage signal to be monitored, said control logic signals being responsive to information received from said basis waveform generating means; and means for isolating said control logic signals referenced to a digital ground system from said satellite sampling modules referenced to a floating ground system.

2. An analog isolation barrier data acquisition system as recited in claim 1, further comprising storage means electrically connected to the output of said demodulation means for retaining the waveform information demodulated therein.

3. An analog isolation barrier data acquisition system as recited in claim 1, wherein said basis waveform generation means comprises:

(a) integrator means for generating an output waveform which ramps upwards at a rate of +X volts/sec or downwards at a rate of −X volts/sec, said integrator means having a first control signal input;

(b) limit detection means for producing a first control signal and its inverse based on the magnitude of said output waveform from said integrator means, said first control signal being transmitted from said limit detection means to said master control means for use therein, said inverse of said first control signal being transmitted from said control logic means to said first control signal input of said integrator means for use therein in controlling the direction of said output waveform ramping;

(c) high pass filter means electrically connected to the output of said integrator means for removing any dc content contained in said output waveform, said high pass filter means producing a symmetrical output waveform about the zero volt axis;

(d) polarity detection means, monitoring said symmetrical output waveform from said high pass filter means, for generating a polarity control signal for use by said master control means, said polarity control signal transitioning upon a change of polarity of said symmetrical output waveform; and (e) power drive means coupled to said high pass filter means for amplifying said symmetrical output waveform to a suitable level for use by said modulation means of said satellite sampling modules.

4. An analog isolation barrier data acquisition system as recited in claim 1, wherein said modulation means comprises:

(a) means for transforming said basis waveform from an analog ground reference system to a floating ground reference system producing a first transformed basis waveform of like magnitude thereby, said transformer means further producing a second transformed basis waveform of like magnitude referenced to an analog ground system; and (b) means coupled to said transformer means for comparing the magnitude of said first transformed basis waveform to that of the selected dc voltage signal, said comparison means generating an output hold control signal when the magnitude of said first transformed basis waveform and the magnitude of the selected dc signal are approximately equal, said output hold control signal being transferred to said barrier coupling means.

5. An analog isolation barrier data acquisition system as recited in claim 1, wherein said demodulation means comprises a peak hold circuit having a first and a second control input, an analog signal input and an a demodulated signal output, said analog signal input being coupled to said second transformed basis waveform of said transformer means, said demodulated signal output tracking said analog signal input until said first control input, which is coupled to the output of said barrier coupling means, receives said output hold signal, said demodulated signal output then holding on the magnitude present at said analog signal input, said demodulated signal output maintaining its magnitude until a reset signal is received at said second control input from said master control means, said demodulated signal output subsequently tracking said analog signal input.

* * * * *